(12) United States Patent
Tooyama

(10) Patent No.: US 7,440,828 B2
(45) Date of Patent: Oct. 21, 2008

(54) OPERATION CHECKING METHOD FOR ADAPTIVE FRONT LIGHTING SYSTEM

(75) Inventor: Tadashi Tooyama, Sayama (JP)

(73) Assignee: Honda Motor Co., Ltd., Tokyo (JP)

( * ) Notice: Subject to any disclaimer, the term of this patent is extended or adjusted under 35 U.S.C. 154(b) by 508 days.

(21) Appl. No.: 10/563,342

(22) PCT Filed: Dec. 15, 2004

(86) PCT No.: PCT/JP2004/019139

§ 371 (c)(1),
(2), (4) Date: Jan. 3, 2006

(87) PCT Pub. No.: WO2005/059501

PCT Pub. Date: Jun. 30, 2005

(65) Prior Publication Data

US 2006/0161319 A1    Jul. 20, 2006

(30) Foreign Application Priority Data

Dec. 16, 2003    (JP) .............................. 2003-418640

(51) Int. Cl.
  *G06F 19/00*    (2006.01)
(52) U.S. Cl. .................... 701/29; 701/49; 307/10.8
(58) Field of Classification Search .................. 701/29, 701/36, 49; 307/9.1, 10.8; 362/459–460, 362/464–465
See application file for complete search history.

(56) References Cited

U.S. PATENT DOCUMENTS

| 6,886,957 | B2 * | 5/2005 | Uchida | 362/37 |
|---|---|---|---|---|
| 6,969,183 | B2 * | 11/2005 | Okubo et al. | 362/466 |
| 7,241,028 | B2 * | 7/2007 | Hasumi | 362/276 |
| 7,268,679 | B2 * | 9/2007 | Garcia Briz | 340/469 |
| 2002/0163814 | A1 | 11/2002 | Toshihisa et al. | |
| 2003/0057955 | A1 | 3/2003 | Gumbel et al. | |
| 2003/0114974 | A1 | 6/2003 | Smith et al. | |
| 2005/0243566 | A1 * | 11/2005 | Hasumi | 362/465 |

FOREIGN PATENT DOCUMENTS

| EP | 0 108 257 | 5/1984 |
|---|---|---|
| JP | 01-111546 | 4/1989 |
| JP | 2001-195110 | 7/2001 |
| JP | 2003-030745 | 1/2003 |
| JP | 2003-054312 | 2/2003 |

* cited by examiner

*Primary Examiner*—Yonel Beaulieu
(74) *Attorney, Agent, or Firm*—Carrier, Blackman & Associates, P.C.; Joseph P. Carrier; William D. Blackman

(57) ABSTRACT

An operation checking method for an adaptive front lighting system (AFS), which is applicable to on-line automobile inspections involves an operation checking program prepared to activate the AFS in a manner to perform its prescribed headlamp illumination redirecting function and stored in advance in an in-vehicle ECU. While a finished vehicle remains stationary at an inspection zone of an automobile production and assembly line, the operation checking program is executed. During a run-time of the program, an inspection is performed to determine whether the headlamp illumination has been redirected by the AFS in leftward, rightward, downward and upward directions in a predetermined sequence as specified by the operation checking program.

7 Claims, 6 Drawing Sheets

OPERATION CHECKING METHOD FOR ADAPTIVE FRONT LIGHTING SYSTEM

CROSS-REFERENCE TO RELATED APPLICATIONS

The present invention is the US National Phase of International Application PCT/JP2004/019139, filed 15 Dec. 2004, which claims priority under 35 USC 119 based on Japanese patent application No. 2003-418640, filed 16 Dec. 2003. The entire contents of the International and priority Japanese applications are incorporated herein by reference.

TECHNICAL FIELD

The present invention relates to a method of checking operation of an adaptive front lighting system that is able to adjust the direction of headlamp illumination in accordance with both steering angle and vehicle speed.

BACKGROUND ART

Advanced technologies to adjust the direction of headlamp illumination in accordance with steering angle and vehicle speed, generally called "adaptive front lighting system (AFS)", have been developed and put into practical use in recent years. One example of such technologies is disclosed in Japanese Patent Laid-Open Publication (JP-A) No. 01-111546.

As shown in FIG. 6 hereof, the disclosed technology varies the length, width and direction of the headlamp illumination according to the angle of the steering wheel and the vehicle speed. Reference numeral 2 denotes a headlamp illumination pattern provided when the steering wheel is turned to the left. Similarly, when the steering wheel is turned to the right, a headlamp illumination pattern denoted by 4 is obtained. The headlamp illumination pattern can thus be redirected depending on the steering angle. A long slim headlamp illumination pattern denoted by 5 is provided when the vehicle is traveling straight ahead at high speeds, while a relatively wide but shorter headlamp illumination pattern denoted by 3 is provided when the vehicle is traveling straight ahead at low speeds. Headlamps of the vehicle are denoted by reference numeral 6.

Operation of the adaptive front lighting system is checked or inspected by the automobile manufacturer before shipment of the vehicle. For such inspection, the automobile manufacturer must prepare a test course or circuit sufficiently large enough to permit actual traveling of the vehicles. When darkness arrives or during nighttime, finished vehicles are put into actual run or traveling on the circuit so as to determine whether the adaptive front lightening system operates in a specified manner depending on steering angle and vehicle speed. Obviously, those vehicles produced during daytime must stand by in an appropriate space, such as a parking lot, before the inspection during darkness is started.

The conventional operation checking method discussed above requires a large amount of facility cost due to the necessity of the relatively large test circuit and parking lot.

Furthermore, due to a large time lag existing between the production and the checking of the vehicles equipped with the adaptive front lighting system, even if a fault is detected by the checking process, information about the detected fault is fed back with a great delay to a relevant part of an automobile production and assembly line. This allows production of a large number of vehicles with defective adaptive front lighting systems installed therein.

It is, therefore, an object of the present invention to provide a method of checking operation of an adaptive front lighting system, which can be applied to on-line inspections of an automobile production and assembly line.

SUMMARY OF THE INVENTION

According to the present invention, there is provided a method of checking operation of an adaptive front lighting system having a function of redirecting headlamp illumination in both a horizontal direction and a vertical direction in accordance with steering angle, traveling speed and incline of a vehicle, the method comprising the steps of: storing an operation checking program in advance in an electronic control unit installed in the vehicle, the program being prepared to activate the adapted front lighting system to perform the function thereof under the control of the electronic control unit such that the headlamp illumination is redirected leftward, rightward, downward and upward in a predetermined sequence; while the vehicle remains stationary at an inspection zone of an automobile production and assembly line, energizing the electronic control unit with electric power supplied from a battery installed in the vehicle and switching on headlamps of the vehicle; then, causing the operation checking program to run, thereby activating the adaptive front lighting system; and during a run-time of the operation checking program, performing an inspection to determine whether the headlamp illumination has been redirected leftward, rightward, downward and upward in the predetermined sequence specified in accordance with the operation checking program.

By virtue of the operation checking program stored in advance in the electronic control unit, the operation checking method of the present invention can be applied to an on-line automobile inspection system wherein necessary inspection and checking processes are carried out while the vehicle remains stationary at the inspection zone of the automobile production and assembly line. Accordingly, it is no longer necessary for the automobile manufacturer to make a huge investment in the construction of AFS inspection facilities including new test course and parking lot.

Preferably, the operation checking program can be executed only one time. This arrangement will preclude the change of accidental activation of the adaptive front lighting system which may otherwise occur during traveling of the vehicle when the operation checking program can be executed more than one time.

During the run-time of the operation checking program, the electronic control unit may perform a diagnostic operation to detect the occurrence of a fault on the basis of answer back signals from structural components of the adaptive front lighting system, and when a fault occurs, the electric control unit issues a signal to turn on a warning lamp on a dashboard of the vehicle.

Information about the detected fault is fed back to a relevant processing zone of the automobile production and assembly line to take appropriate measures on a real-time basis.

In one form of the invention, the inspection performed during the run-time of the operation checking program comprises a visual inspection by a human operator.

DETAILED DESCRIPTION OF THE INVENTION

One preferred embodiment of the present invention will be described below in greater detail with reference to the accompanying sheets of drawings.

Figure 1A:
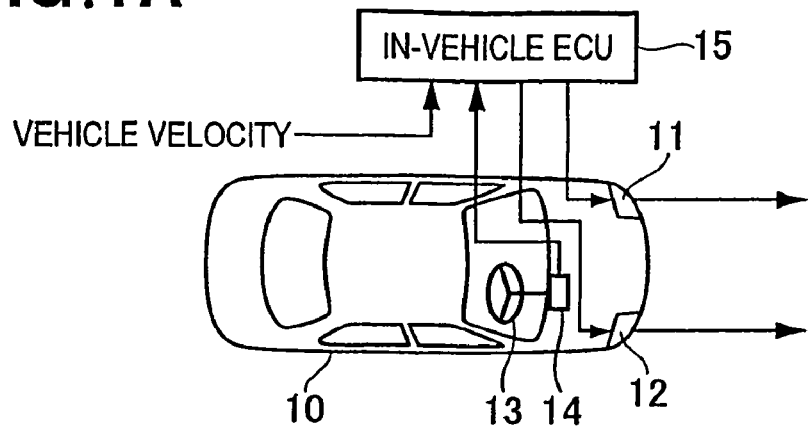
FIGS. 1A, 1B and 1C are schematic plan views showing the operation of an adaptive front lighting system incorporated in a motor vehicle.
Figure 1B:
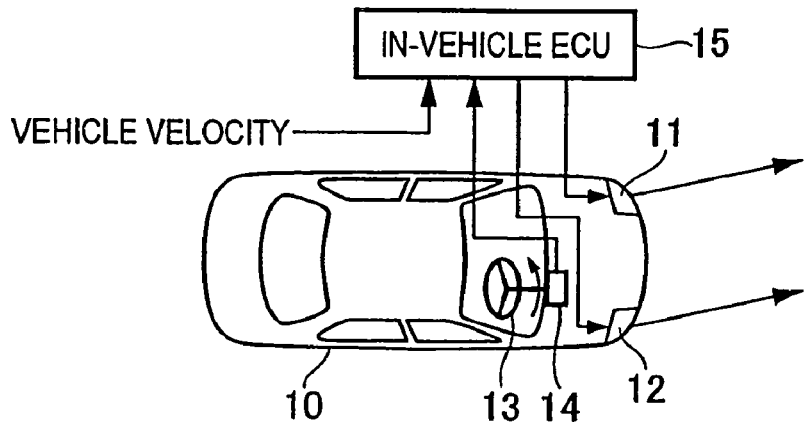
Figure 1C:
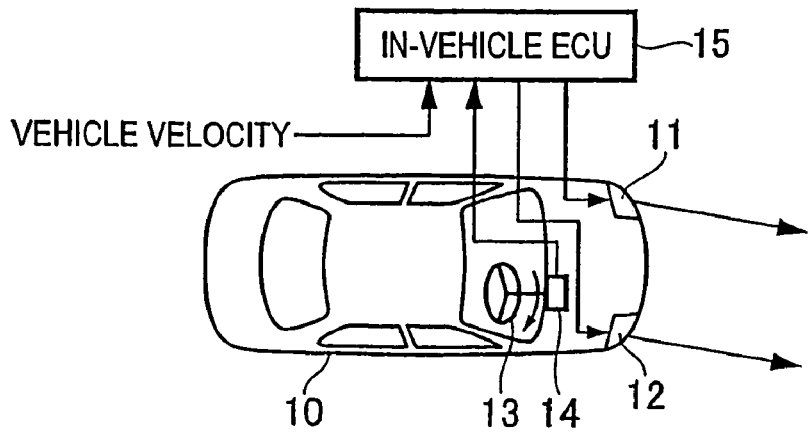

FIGS. 1A, 1B and 1C schematically show operation of an adaptive front lighting system (AFS) incorporated in a motor vehicle 10. The AFS includes left and right headlamps 11 and 12 and an in-vehicle electronic control unit (ECU) 15. The ECU is configured to adjust the directions of illumination of the respective headlamps 11, 12 on the basis of vehicle speed information and steering angle information. The steering angle information is supplied from a steering angle sensor 14, which is provided to detect steering angle of a steering wheel 13. The vehicle speed information is supplied from a vehicle speed sensor (not shown).

When the steering wheel 13 is turned to the left as shown in FIG. 1B, the AFS, under the control of the in-vehicle ECU 15, changes the directions of illumination of the headlamps 11, 12 leftward from the normal straight-ahead direction. In this instance, if the vehicle speed information indicates that the current vehicle speed is below a predetermined speed (20 km/h, for example), the in-vehicle ECU disables the AFS and, hence, the redirection or bending of headlamp illumination does not occur.

Similarly, when the steering wheel 13 is turned to the right as shown in FIG. 1C, the in-vehicle ECU 15 controls the AFS such that the directions of illumination of the headlamps 11, 12 are changed to the right. In this instance, if the vehicle speed is below the predetermined speed, the redirection of headlamp illumination does not take place.

Figure 2A:
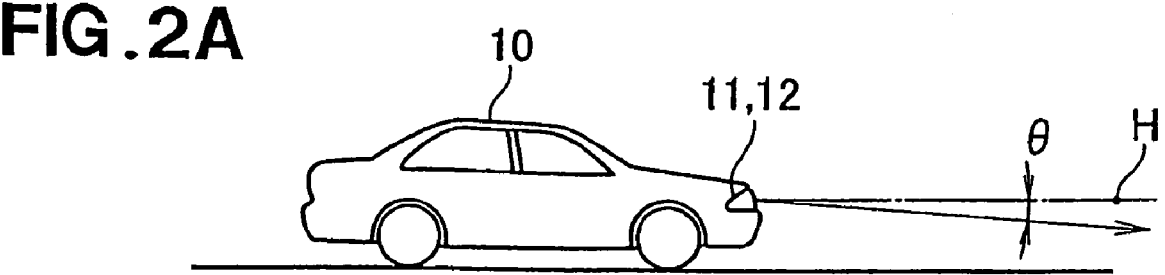
FIGS. 2A, 2B and 2C are schematic side views illustrative of the operation of an automatic leveling system associated with the adaptive front lighting system of the motor vehicle.
Figure 2B:
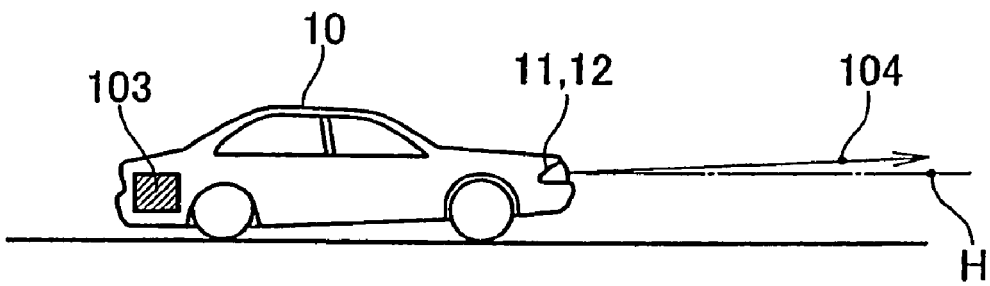
Figure 2C:
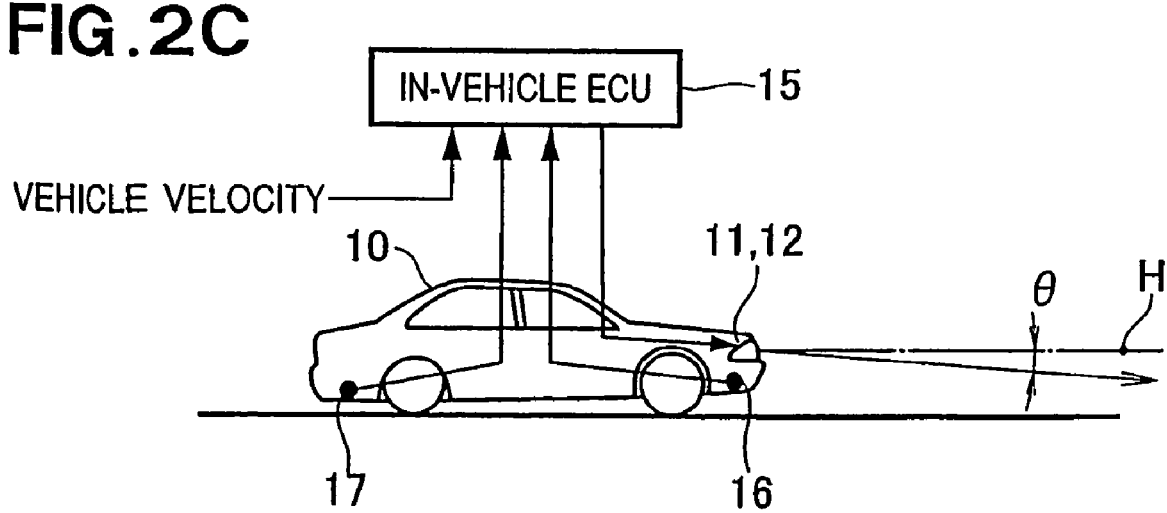

FIGS. 2A, 2B and 2C schematically illustrate operation of an automatic leveling system incorporated in the adaptive front lighting system.

In a normal headlamp illuminating condition shown in FIG. 2A, beam axes of the headlamps 11, 12 are set to be slightly inclined downward (at an angle θ of about 2°, for example) from the horizontal.

When a heavy load 103 is placed in a rear trunk room of the vehicle 10, the rear of the vehicle 10 sinks down, causing the headlamp beam axes to tilt upward and become lying above the horizontal, as denoted by numeral 104 shown in FIG. 2B.

To avoid this problem, the automatic leveling system includes a front level sensor 16 and a rear level sensor 17 that are used in combination to detect an incline of the vehicle 10, as shown in FIG. 2C. On the basis of the detected vehicle incline, the in-vehicle ECU 15 activates left and right auto-leveling mechanisms to bend the beam axes of the headlamps 11, 12 downward until the beam axes assume the normal position shown in FIG. 2A.

Now, description will be given to an operation checking system, which is employed in accordance with the present invention to check operation of the adaptive front lighting system of the type described above.

Figure 3:
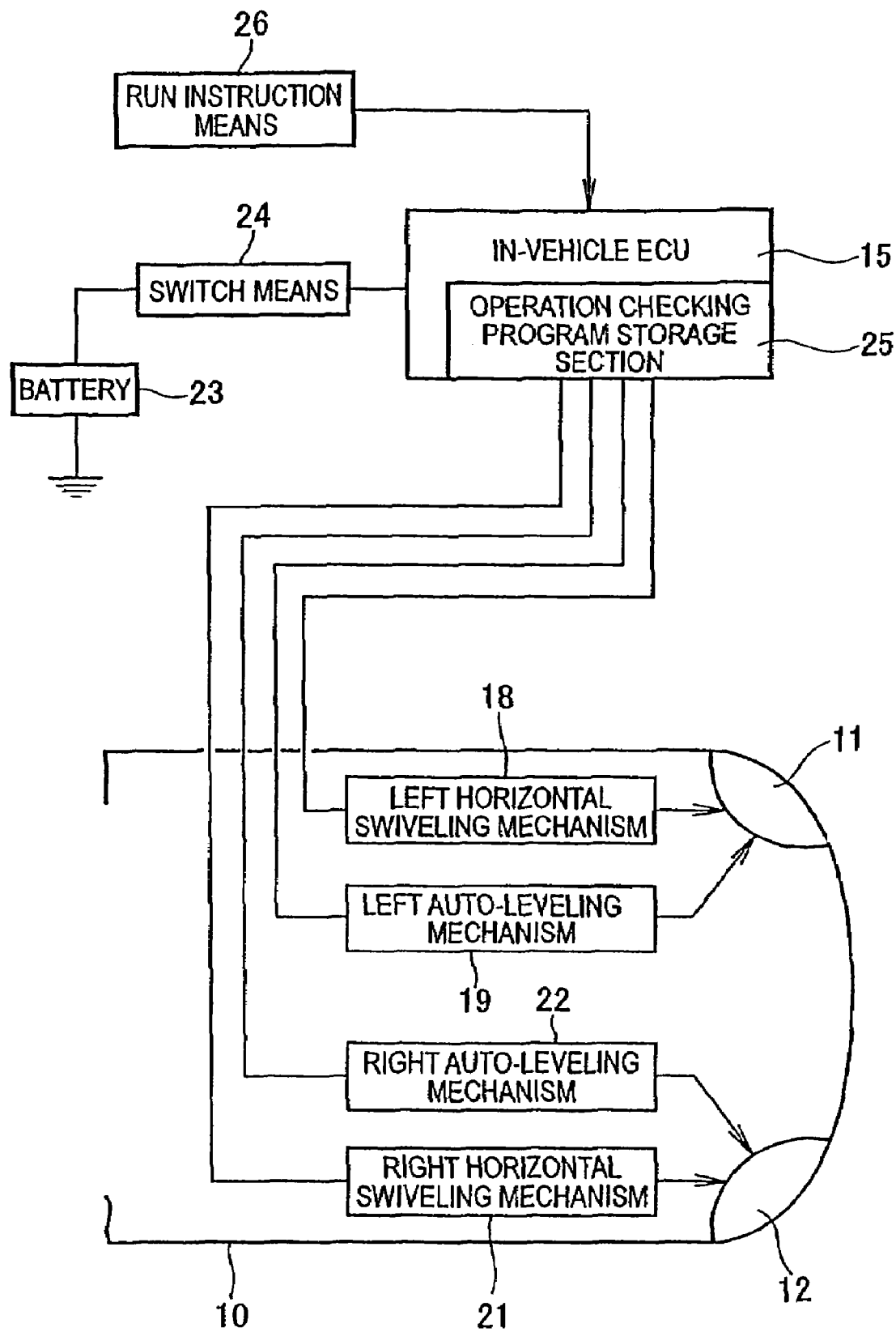
FIG. 3 is a block diagram showing the general configuration of an operation checking system for checking operation of the adaptive front lighting system according to an embodiment of the present invention.

FIG. 3 shows in block diagram a general configuration of the operation checking system and the adaptive front lighting system linked with each other. The adaptive front lighting system includes a left horizontal swiveling mechanism 18 for changing the direction of illumination (including illumination pattern) of the left headlamp 11 in a horizontal plane, a left auto-leveling mechanism 19 for adjusting the level or vertical position of a beam axis of the left headlamp 11, a right horizontal swiveling mechanism 21 for changing the direction of illumination of the right headlamp 12 in a horizontal plane, and a right auto-leveling mechanism 22 for adjusting the vertical position of a beam axis of the right headlamp 12. The adaptive front lighting system further includes an in-vehicle electric control unit (ECU) 15 so configured as to control operations of the swiveling and auto-leveling mechanisms 18, 19, 21 and 22, an in-vehicle battery 23 for supplying electric power to the ECU 15, and a switch means 24 including various operation switches such as a main switch (ignition key switch) and a combination switch. Though not shown, the left and right horizontal swiveling mechanisms 18 and 21 each have a swivel actuator such as stepping motor. Similarly, the left and right auto-leveling mechanisms 19 and 22 each have a leveling actuator such as stepping motor. The in-vehicle ECU 15 is also connected to the steering angle sensor 14 (FIG. 1), the non-illustrated vehicle speed sensor, and the front and rear level sensors 16, 17, so that detection signals from the respective sensors are inputted to the ECU 15.

The operation checking system generally comprises an operation checking program storage part or section 25 always remaining in a memory of the in-vehicle ECU 15 and storing therein an operation checking program (described later) to be achieved by a microprocessor of the in-vehicle ECU 15, and a run instruction means 26 for supplying a program run instruction signal to the in-vehicle ECU 15 to thereby execute the operation checking program. The run instruction means 26 may be substituted by an on-off operation of one of the existing switches 24, such as a passing switch, that is repeated in several times during a prescribed short duration of time.

Figure 4:
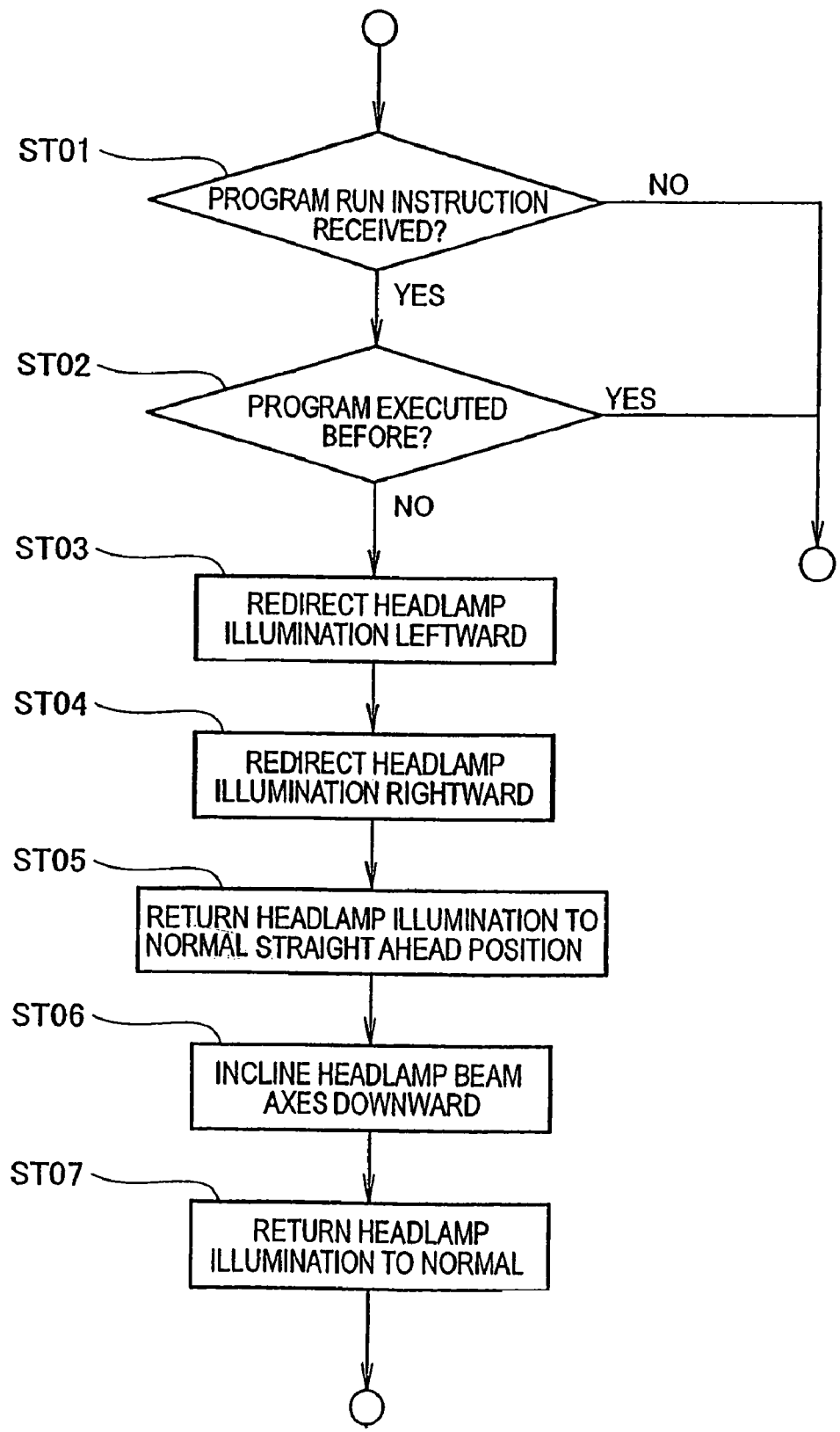
FIG. 4 is a flowchart showing a sequence of operations achieved in accordance with an operation checking program so as to check operation of the adaptive front lighting system.

FIG. 4 is a flowchart showing a sequence of operations achieved by the microprocessor of the ECU 15 in accordance with the operation checking program so as to check the operation of the adaptive front lighting system.

A step ST01 determines whether or not a program run instruction signal from the run instruction means 26 (FIG. 3) has been received. If the result of determination is affirmative, the control procedure goes on to a step ST02. Alternatively, if the determination result is negative, the control procedure is terminated.

The step ST02 determines whether or not the operation checking program has been executed before. If the result of determination is affirmative (i.e., log or record indicates prior execution of the operation checking program), the control procedure is terminated. Alternatively, if the determination result is negative, the control procedure goes on to a step ST03.

At the step ST03, the headlamp illumination direction is bent or changed to the left. More specifically, the left and right horizontal swiveling mechanisms 18 and 21 (FIG. 3) operate to direct illumination patterns of the left and right headlamps 11, 12 in a leftward direction.

The step ST03 is followed by a step ST04 where the headlamp illumination direction is bent or changed to the right. Stated more specifically, the left and right horizontal swiveling mechanisms 18, 21 operate to redirect illumination patterns of the left and right headlamps 11, 12 in a rightward direction.

After the step ST04, the control procedure advances to a step ST05 where illumination patterns of the left and right headlamps 11, 12 are returned to a normal straight-ahead position.

The step ST05 is followed by a step ST06 where the left and right auto-leveling mechanisms 19 and 22 (FIG. 3) are operated to dip or incline respective beam axes of the left and right headlamps 11, 12 in a downward direction.

Subsequently, a final step ST07 operates the left and right auto-leveling mechanisms 19, 22 so that the beam axes of the left and right headlamps 11, 12 return to their original positions.

As understood from the foregoing description, the operation checking program is prepared to activate the adaptive front lighting system in a manner to perform the function thereof under the control of the in-vehicle ECU 15 such that the headlamp illumination is redirected leftward, rightward, downward and upward in a predetermined sequence.

The operation checking program does not require on-site installation. Namely, it is not necessary for an inspection operator to install the operation checking program when a finished vehicle is transferred to an inspection site or zone provided at a downstream end of an automobile production and assembly line. Rather, the operation checking program is preferably installed in advance in the storage section 25 (FIG. 3) of the ECU 15 at the same time other control programs are installed in the memory of the ECU 15 before the ECU 15 is assembled in the vehicle. The steps ST03-ST07 shown in FIG. 4 may be achieved in a different sequence than as discussed above.

Figure 5:
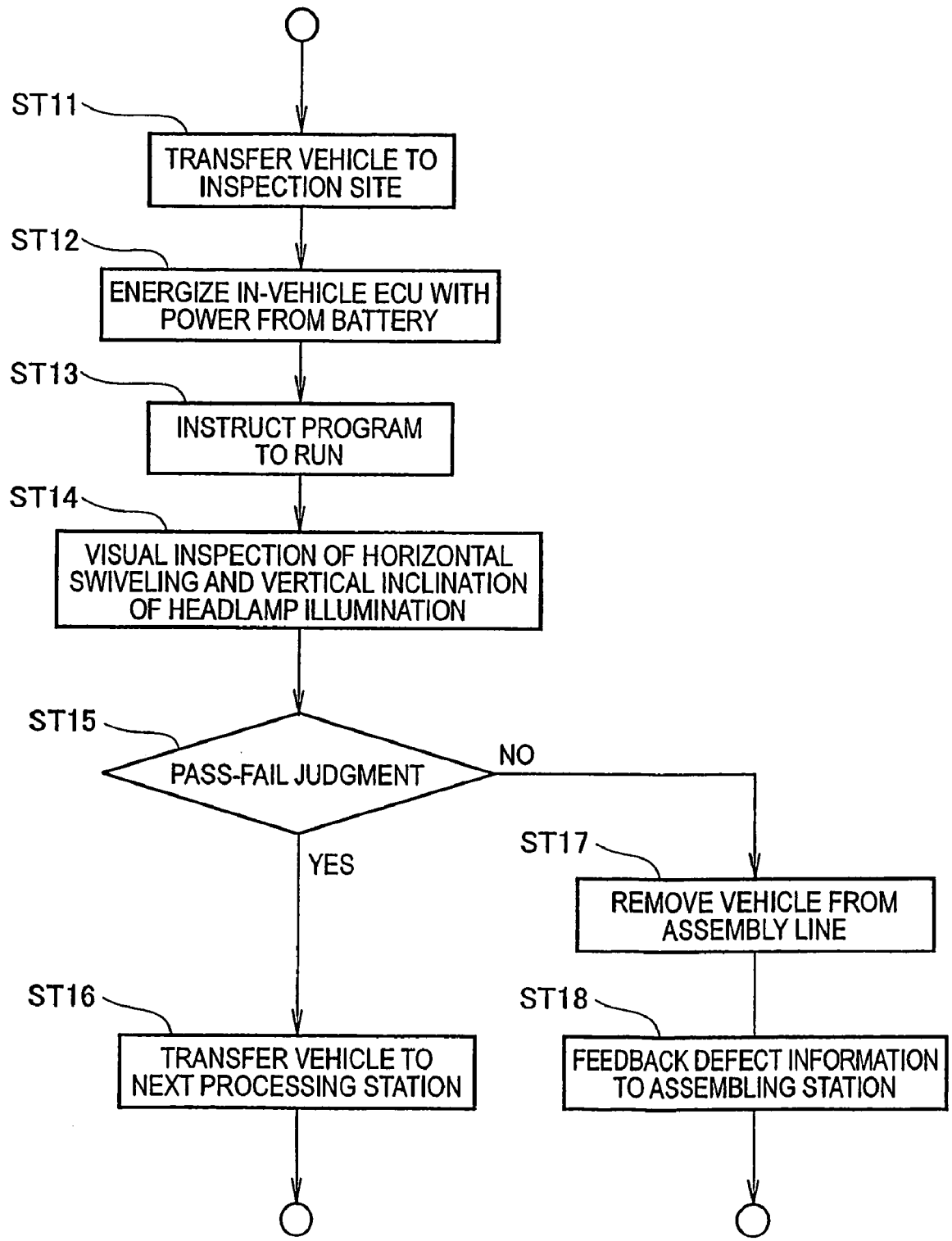
FIG. 5 is a flowchart showing a sequence of operations achieved to carry out an operation checking method of the invention on a vehicle production and assembly line.
Figure 6:
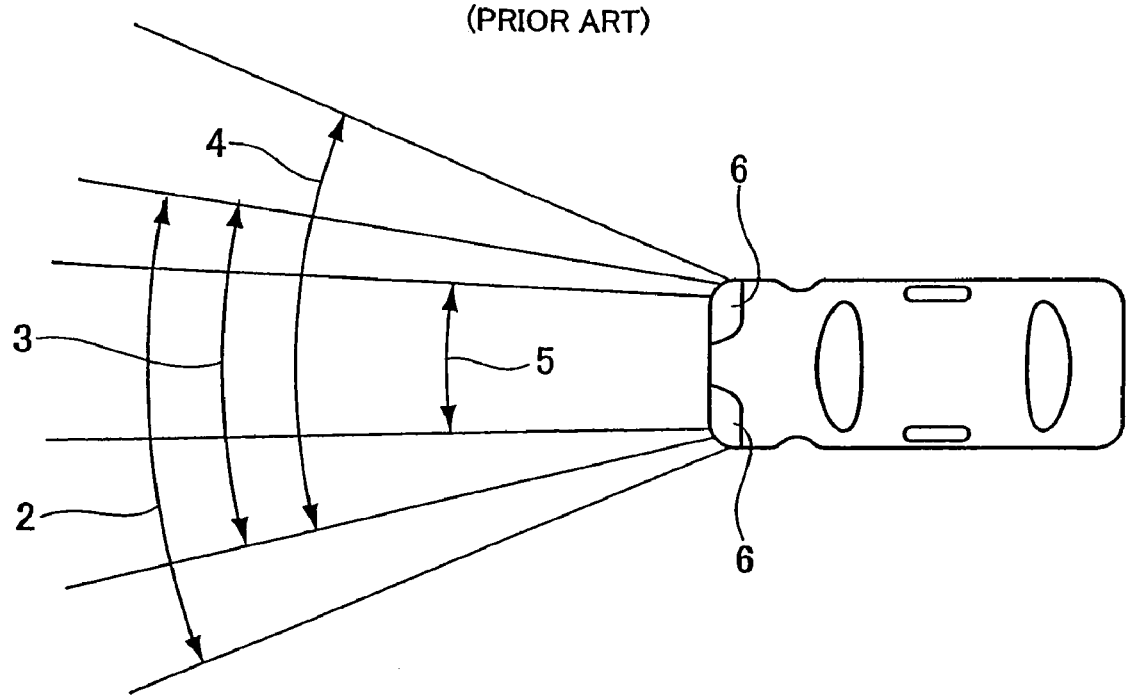
FIG. 6 is a schematic plan view showing headlamp illumination patterns achieved by a conventional adaptive front lighting system.

FIG. 5 is a flowchart showing a sequence of operations achieved to carry out the operation checking method of the invention with respect to finished motor vehicles equipped with the adaptive front lighting system.

At a first step ST11, a finished motor vehicle equipped with an adaptive front lighting system (AFS) is transferred into a finished vehicle inspection site or zone that is provided at a downstream end of an automobile production and assembly line.

Then, at a step ST12, a main switch (ignition key switch) forming a part of the switch means 24 (FIG. 3) of the vehicle is turned on whereupon the in-vehicle ECU 15 is energized with electric power supplied from the in-vehicle battery 23. At the same step ST12, a headlamp switch is turned on to place the left and right headlamps 11, 12 in a turn-on state.

Subsequently, at a step ST13, an inspection operator provides a program run instruction through the run instruction means 26 (FIG. 3) to the in-vehicle ECU 15 whereupon the operation checking program stored in the operation checking program storage section 25 of the in-vehicle ECU 15 is caused to run. The program run instruction signal may be supplied in a different manner than as achieved by the inspection operator.

At a next following step ST14, the inspection operator undertakes a visual inspection to determine whether the illumination patterns of the left and right headlamps have been redirected leftward and rightward and also inclined downward in the predetermined sequence as specified by the operation checking program. The visual inspection may be replaced with an automated inspection using a suitable electronic optical instrument such as an illumination sensor.

While the AFS performs its prescribed swiveling and auto-leveling operations in accordance with the operation checking program (i.e., during a run-time of the operation checking program), the in-vehicle ECU 15 performs a diagnostic operation by continuously monitoring answer back signals from structural components of the AFS including the automatic leveling system (i.e., the left and right swiveling mechanisms 18, 21 including respective actuators, the left and right auto-leveling mechanisms 19, 22 including respective actuators, the steering angle sensor 14, the un-shown vehicle speed sensor, and the level sensors 16, 17). Through the diagnostic operation, the ECU 15 detects, on the basis of the answer back signals, a fault which may occur to one of the actuators, sensors and wire harnesses in the form of a malfunction of component, faulty wiring, or breaking of wire. When a fault occurs, the ECU 15 issues an electric signal to turn on a warning lamp (not shown) on the dashboard of the vehicle. Thus, the inspection operator can readily acknowledge the occurrence of a problem.

Subsequently, a pass-fail judgment is made at a step ST15. In this instance, information obtained through visual inspection by the inspection operator and information given by the warning lamp are used in combination to determine whether operation of the AFS incorporated in the vehicle is acceptable. If the judgment is affirmative, the procedure goes on to a step ST16 where the vehicle with acceptable AFS is transferred to a next subsequent processing zone or station.

Alternatively, if the judgment at the step ST15 is negative, the procedure is blanched to a step ST 17 where the vehicle with defective AFS is removed from the vehicle production and assembly line for off-line repairing of the defective AFS. Then, at a step ST18, information concerning a fault or failure obtained during inspection with respect to the defective AFS is fed back to a relevant processing part or station of the vehicle production and assembly line for taking appropriate measures to remove the fault on a real-time basis. The step ST18 is particularly advantageous because if a fault detected by the step ST14 with respect to one AFS is due to faulty wiring, it will provably occur that all of the succeeding AFSs also have the same fault as they are produced in the same lot as the detected faulty AFS.

It will be readily appreciated that the operation checking method of the present invention can be carried out while the vehicle remains stationary at an inspection zone provided at a downstream end of the automobile production and assembly line. With this on-line operation checking method, it is no longer necessary for the automobile manufacturer to make a huge investment in the construction of AFS inspection facilities including new test course and parking lot. Another advantage attained by the on-line operation checking system is that when a fault is detected during inspection or checking, appropriate measures to remove the defect can be taken on a real-time basis. This can reduce a total number of vehicles produced with faulty AFSs installed therein.

The operation checking process of the present invention is carried out while the vehicle remains stationary at the inspection zone. Accordingly, it may occur that the adaptive front lighting system (AFS) does not operate properly when the vehicle is traveling. In this instance, however, since operations of the structural components (i.e., actuators, sensors, and wire harnesses) of the AGS have already be checked in accordance with the on-line operation checking method of the invention, one can readily estimate that the operation failure would be due to a fault in a AFS control program other than the operation checking program. Thus, the on-line operation checking method of the present invention insures high reliability comparable that of the conventional method achieved while the vehicle is traveling on a test course.

In the illustrated embodiment, the operation checking program can be executed only one time. This is because if the program can be executed more than one time, it may occur that due to accidental or unintentional execution of the operation checking program, the headlamp illumination is redirected left and right and down and up while the user drives the vehicle. Such accidental activation of the AFS will hinder smooth and safe driving of the vehicle.

It is possible according to the invention to modify the operation checking program to be executable more than one time on the condition that entry of security code is acknowledged.

INDUSTRIAL APPLICABILITY

With the arrangements so far described, the present invention can be used advantageously as an operation checking method for an adaptive front lighting system (AFS), which is applicable to on-line inspections achieved while the vehicle remains stationary at an inspection zone provided at a downstream end of an automobile production and assembly line.

Although there have been described what are the present exemplary embodiments of the invention, it will be understood that variations and modifications may be made thereto within the spirit and scope of the appended claims.

The invention claimed is:

1. A method of checking operation of an adaptive front lighting system having a function of redirecting headlamp illumination in both a horizontal direction and a vertical direction in accordance with steering angle, traveling speed and incline of a vehicle, the method comprising the steps of:
   storing an operation checking program in advance in an electronic control unit installed in the vehicle, the program being prepared to activate the adapted front lighting system to perform the function thereof under the control of the electronic control unit such that the headlamp illumination is redirected leftward, rightward, downward and upward in a predetermined sequence;
   while the vehicle remains stationary at an inspection zone of an automobile production and assembly line, energizing the electronic control unit with electric power supplied from a battery installed in the vehicle and switching on headlamps of the vehicle;
   then, causing the operation checking program to run, thereby activating the adaptive front lighting system; and
   during a run-time of the operation checking program, performing an inspection to determine whether the headlamp illumination has been redirected leftward, rightward, downward and upward in the predetermined sequence specified in accordance with the operation checking program.

2. The method as defined in claim 1, wherein the operation checking program can be executed only one time.

3. The method as defined in claim 1, wherein during the run-time of the operation checking program, the electronic control unit performs a diagnostic operation to detect the occurrence of a fault on the basis of answer back signals from structural components of the adaptive front lighting system, and when a fault occurs, the electric control unit issues a signal to turn on a warning lamp on a dashboard of the vehicle.

4. The method as defined in claim 1, wherein the inspection performed during the run-time of the operation checking program comprises a visual inspection by a human operator.

5. The method as defined in claim 2, wherein during the run-time of the operation checking program, the electronic control unit performs a diagnostic operation to detect the occurrence of a fault on the basis of answer back signals from structural components of the adaptive front lighting system, and when a fault occurs, the electric control unit issues a signal to turn on a warning lamp on a dashboard of the vehicle.

6. The method as defined in claim 2, wherein the inspection performed during the run-time of the operation checking program comprises a visual inspection by a human operator.

7. The method as defined in claim 3, wherein the inspection performed during the run-time of the operation checking program comprises a visual inspection by a human operator.

* * * * *